October 24, 1913.

DRAWING 2,662

A careful search has been made this day for the original drawing or a photolithographic copy of the same, for the purpose of reproducing the said drawing to form a part of this book, but at this time nothing can be found from which a reproduction can be made.

Finis D. Morris,
                              Chief of Division E.

AWK

UNITED STATES PATENT OFFICE.

STEPHEN PARKS, JR., OF BROOKLYN, NEW YORK.

CUT-OFF VALVE FOR STEAM-ENGINES.

Specification of Letters Patent No. 2,662, dated June 11, 1842.

*To all whom it may concern:*

Be it known that I, STEPHEN PARKS, Junr., of the city of Brooklyn, county of Kings, and State of New York, have invented such new and useful additions and improvements to slide-valves as will render them fully effective for expansion-valves also and for expanding steam with certainty and ease to any required degree without any separate or other valve-slide or other contrivance whatever for that purpose; and I hereby declare that the following is a full and sufficient description of the construction and operation of the same, reference being had to the annexed drawings, making a part of this specification.

The same figures refer to the same matters in every part of the drawings in which—

A is the plan; B and D, sections; C, side view of slide valve with vibrating expansive valves attached thereto and connected by a bridle or rod; E, an end view of steam chest showing the position of screw handle, dial and index. F, plan of slide valve steamways therein, faces thereto, and proper supports for vibrating valves.

Figures 1, 1, steam chest; 2, 2, slide valve which is like a common slide valve, except being so far prolonged at each end as to admit and to contain steamways 3, 3, therein and proper faces thereto 4, 4, and proper supports for attaching thereto a vibrating valve 5, 5, over each steamway 3, 3, in slide valve, which vibrating valves are again so connected with each other by a bridle or rod 6, 6, that when one valve is being closed in passing under the nut or slide 7, 7, the other valve is opened at the same time by the connecting bridle or rod 6, 6, and as the nuts or slides 7, 7, are each respectively filled and traversed by a right and left handed screw 8, 8, formed upon one rod which extends the length of steam chest and beyond one end thereof so far as to receive any convenient handle 9, 9.

It is evident that by turning the handle the nuts or slides may be placed and maintained at any required distance from each other upon the rod 8, 8, and then be made to close the steam expansion valves at any required part of the stroke while the relative situation of the slides will become apparent by the position of the index on the dial plate.

Within the steam chest attached to rod 9, is a pinion 10, which takes into a spur wheel 11, to the arbor of which an index 12, is affixed without the steam chest for registering the situation of the slides or nuts within, therefore when by means of the rod or piston 13, the slide valve is caused to reciprocate one of the expansion valves will be closed at any determined period of the stroke by the regulated pressure of the nut or slide while the other expansion valve has been opened by the action of the connecting bridle or rod.

I do not claim the invention of a slide valve or of an expansion valve separately but I do claim as my invention—

The slide valve with such additional steamways and faces thereto in combination with such vibrating expansion valves attached thereto and connected to each other by a bridle or rod and closed at will by nuts or slides, the nuts or slides being adjusted and fixed by right and left handed screws in the manner herein set forth or in any other manner that has substantially the same effect.

STEPHEN PARKS, JR.

Witnesses:
WM. BEEKTON,
THEODORE EAMES.